(12) United States Patent
Sommer

(10) Patent No.: US 11,532,961 B2
(45) Date of Patent: Dec. 20, 2022

(54) POLE LOBED ROTOR CORE

(71) Applicants: Steering Solutions IP Holding Corporation, Auburn Hills, MI (US); Continental Automotive Systems, Inc., Auburn Hills, MI (US)

(72) Inventor: Christopher J. Sommer, Swartz Creek, MI (US)

(73) Assignees: Steering Solutions IP Holding Corporation, Auburn Hills, MI (US); Continental Automotive Systems, Inc., Auburn Hills, MI (US)

( * ) Notice: Subject to any disclaimer, the term of this patent is extended or adjusted under 35 U.S.C. 154(b) by 312 days.

(21) Appl. No.: 16/577,572

(22) Filed: Sep. 20, 2019

(65) Prior Publication Data

US 2020/0099264 A1    Mar. 26, 2020

Related U.S. Application Data

(60) Provisional application No. 62/734,712, filed on Sep. 21, 2018.

(51) Int. Cl.
*H02K 1/2786*    (2022.01)
*H02K 15/03*    (2006.01)

(52) U.S. Cl.
CPC ........... *H02K 1/2786* (2013.01); *H02K 15/03* (2013.01); *H02K 2201/15* (2013.01)

(58) Field of Classification Search
CPC ... H02K 1/2786; H02K 15/03; H02K 2201/15
USPC ............ 310/156.01, 156.22, 156.43, 156.48
See application file for complete search history.

(56) References Cited

U.S. PATENT DOCUMENTS

| | | | |
|---|---|---|---|
| 5,773,908 A * | 6/1998 | Stephens | H02P 6/26 310/216.096 |
| 6,759,780 B2 | 7/2004 | Liu et al. | |
| 2009/0315424 A1 * | 12/2009 | Vollmer | H02K 1/278 310/156.43 |
| 2010/0133939 A1 * | 6/2010 | Takemoto | H02K 29/03 310/156.43 |
| 2013/0334925 A1 * | 12/2013 | Uematsu | H02K 1/274 310/216.092 |
| 2014/0134029 A1 * | 5/2014 | Coghlan, III | F04C 2/1075 29/888.023 |
| 2014/0265707 A1 | 9/2014 | Klein et al. | |
| 2016/0072346 A1 * | 3/2016 | Fischer | H02K 1/278 310/156.12 |
| 2016/0079816 A1 | 3/2016 | Islam et al. | |
| 2016/0141927 A1 | 5/2016 | Pina Ortega | |

FOREIGN PATENT DOCUMENTS

| | | | | |
|---|---|---|---|---|
| CN | 201022157 Y | * | 2/2008 | |
| CN | 102868266 A | * | 1/2013 | |
| GB | 2481406 A | * | 12/2011 | ............... G01B 7/30 |
| WO | WO-2017121986 A1 | * | 7/2017 | ............... H02K 1/14 |

* cited by examiner

*Primary Examiner* — Jose A Gonzalez Quinones
(74) *Attorney, Agent, or Firm* — Brooks Group, PLC

(57) ABSTRACT

A number of illustrative variations may include a rotor core for an electric motor comprising permanent magnets wherein the rotor core comprises lobes of the core material that magnets may be attached to.

21 Claims, 4 Drawing Sheets

POLE LOBED ROTOR CORE

CROSS-REFERENCE TO RELATED APPLICATIONS

This application claims the benefit of U.S. Provisional Application Ser. No. 62/734,712 filed Sep. 21, 2018.

TECHNICAL FIELD

The field to which the disclosure generally relates to includes rotors.

BACKGROUND

Electric Motors typically include rotors.

SUMMARY OF ILLUSTRATIVE VARIATIONS

A number of illustrative variations may include a rotor core for an electric motor comprising permanent magnets wherein the rotor core comprises lobes that magnets may be attached to.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

In a number of illustrative variations, an electric motor may comprise a rotor. The rotor may comprise a rotor core, rotor core lobes, and magnets. The electric motor may also comprise a stator, and the stator may be comprised of stacks of laminated conductive material. The stator may be comprised of a core, slots, teeth, and one or more electrically conductive wire windings that be energized such that an electromagnetic field is generated by the wire windings of the stator. In such illustrative variations, an electric motor may generate an electromagnetic field by energizing the one or more wire windings of the stator thereby causing the stator to exert an electromagnetic force upon the magnets comprising the rotor.

Figure 7:
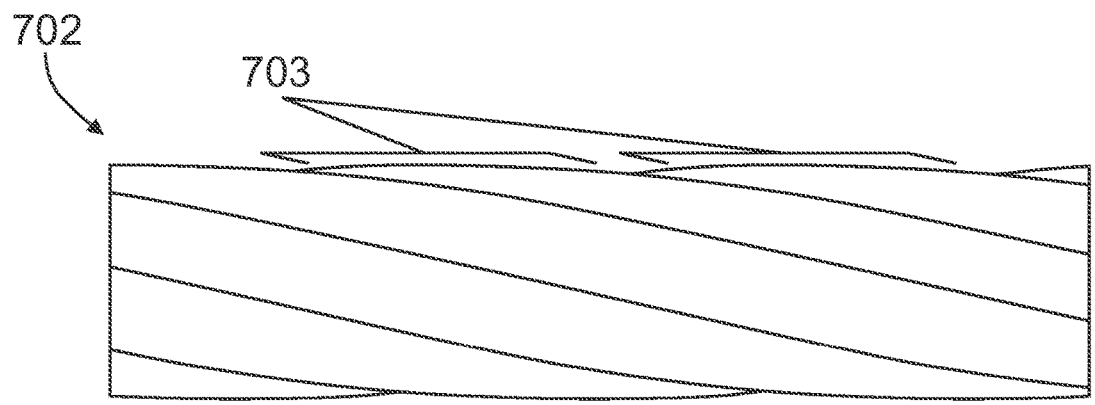
FIG. 7 depicts an axial view of an illustrative variation in which a rotor core comprises skewed lobes.

In a number of illustrative variations, a rotor core may be formed by stamping, casting, extrusion or any other known method. In such variations, the rotor core may be a single piece comprising lobes that is generally cylindrical. The rotor core may also be hollow or comprise at least one hollow portion. The rotor core may also comprise a single piece that resembles a cylinder with lobe pieces attached at its circumference. In some cases, the lobes may run the entire length of the rotor or only a portion of the length. The lobes may be skewed along the circumference of the rotor as the lobe runs the length of the rotor, such that the lobes appear to be twisting around an axial axis of the rotor (as shown in FIG. 7). The lobes may be non-uniform in shape, length, width, height, or position. To that end, a lobe may change in shape, length, width, height, or position as the lobe extends axially along the length of the rotor or as the lobe extends radially from the rotor core. Additionally, the lobes may be distributed symmetrically, placed at regular distances from each other, distributed asymmetrically, placed at irregular distances from each other, or placed or distributed in any other manner.

Figure 8:
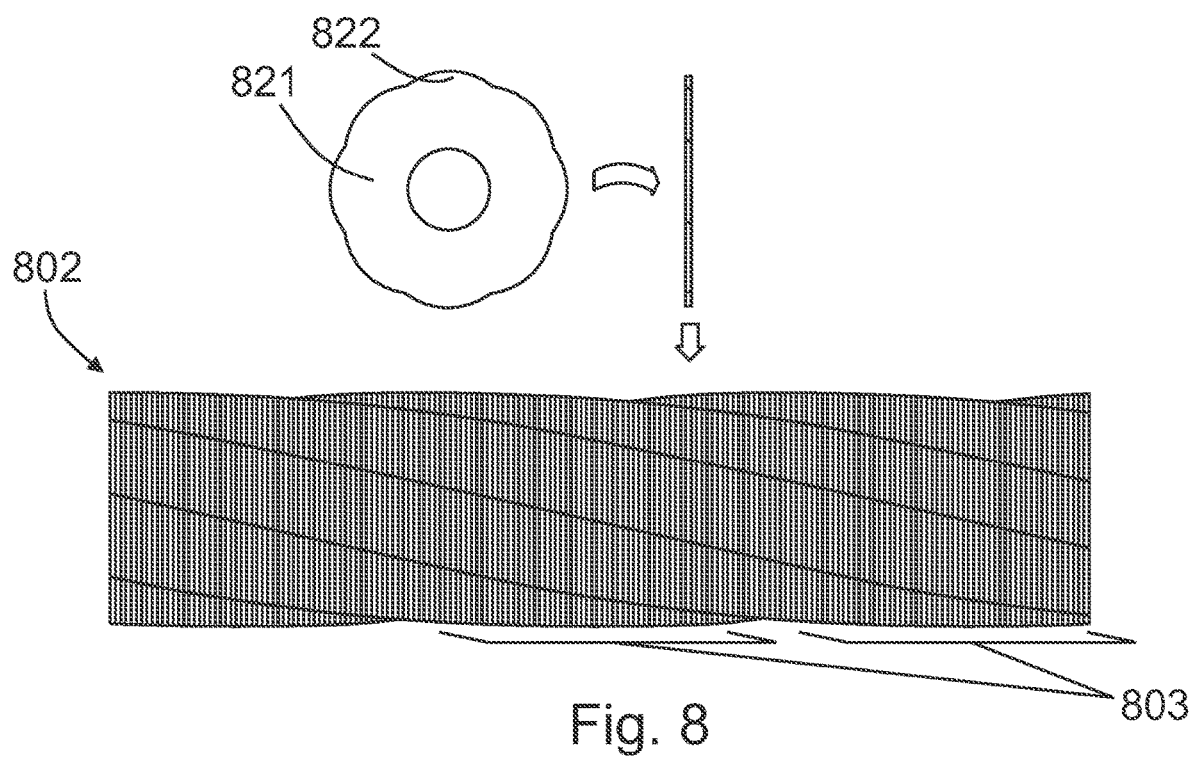
FIG. 8 depicts an axial view of an illustrative variation in which a rotor core is comprised of stacked and bonded disks having lobe-forming anomalies in a radial direction at their circumferences, the disks being comprised of a rotor core material and being stacked and bonded in a skewed fashion such that the lobe-forming anomalies of the stacked and bonded disks form skewed lobes.

In a number of illustrative variations, the rotor core comprises more than one piece. As a non-limiting example, the rotor core may comprise a cylindrical piece with other pieces or appendages attached at its circumference. Additionally, the rotor core may be comprised of segments, slices, or disks of a rotor core material that are stacked and bonded together to form a rotor core with or without rotor core lobes. In a number of illustrative variations, a generally cylindrical rotor core with rotor core lobes is comprised of stacked and bonded disks, each formed of such core material and having lobe-forming anomalies in a radial direction at their circumferences. In such variations, skewed rotor core lobes may be formed by rotating each disk with respect to the disk upon which it is stacked and bonded such that the lobe-forming anomalies of each of the stacked and bonded disks are skewed with regard to each other (as shown in FIG. 8).

In a number of illustrative variations, cogging torque is the torque required to break an alignment of stator slot and rotor magnet alignment during motor operation and may be seen in the operation of an electric motor when a disturbance in rotor rotation is present. This disturbance may largely be caused by the interaction between rotor magnets and the stator slots of the motor. A rotor may be designed to reduce cogging torque by shaving, grinding, cutting, or reducing the rotor magnets such that the torque required to break an alignment of stator slot and rotor magnet alignment during motor operation is reduced. This effect may be achieved while additionally maintaining a relatively low manufacturing cost by reducing or eliminating the need to shave, grind, or cut magnet material in a way that leads to wasted magnet material. In a number of illustrative variations, this may be achieved by adding lobes to the rotor core. Curved or pre-shaped magnets may then be attached to the rotor core lobes, thus reducing cogging torque without the need to reduce the magnets by shaving, grinding, shaping, or cutting. In such illustrative variations, the shape of the lobe may be designed to provide a shaped seat for a magnet that will aid the reduction of rotor magnet production costs by reducing or removing the need to shave, shape, cut or reduce the magnet in any other known fashion during or after manufacturing.

In a number of illustrative variations, cogging torque may also be reduced or eliminated by putting notches in a stator tooth face. In a number of illustrative variations, notches in the faces of the stator teeth may be combined with the addition of rotor core lobes to the rotor to reduce cogging torque and/or manufacturing costs of a motor.

In a number of illustrative variations, a rotor core may rotate about an axial axis during the operation of an electric motor. The rotor may be described by a primary radius that is a component of an imaginary cylinder encompassing the entire rotor. The rotor core may also include pole lobes having a shorter curvature radius at their face than the primary radius, such that any curved magnet attached to a lobe face may have a shorter curvature radius on its inner face than the primary radius. The rotor may also be described by a secondary radius that is a component of an imaginary cylinder encompassing the largest, unbroken cylinder of rotor core material that does not include the rotor core lobes. The lobe curvature radius may be of a different length than the primary radius and the secondary radius. Additionally, the magnet attached to the pole lobe face may have an inner and outer curvature radius that is the same length as the lobe face curvature radius. In such illustrative variations, during manufacturing of the magnets, cutting the inner curvature radius of one magnet also cuts the outer curvature radius of another magnet. Similarly, in such illustrative variations, cutting the outer curvature radius of one magnet also cuts the inner curvature radius of another magnet.

Figure 1:
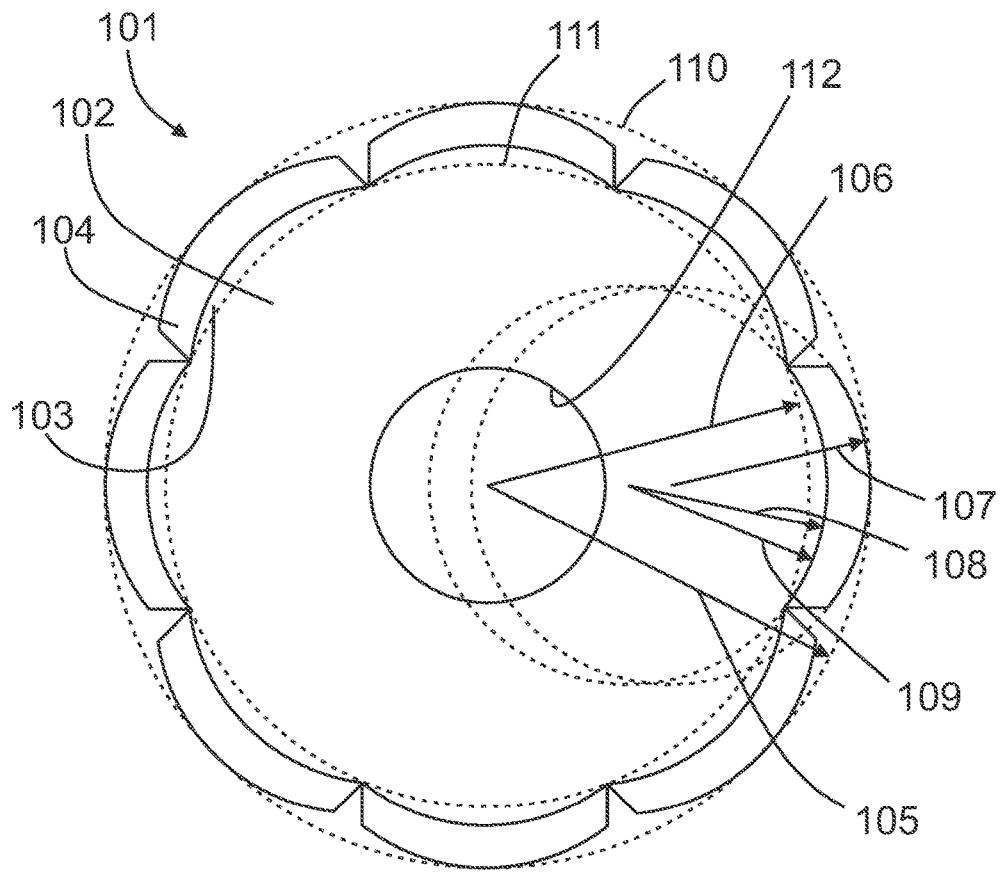
FIG. 1 depicts a radial view of an illustrative variation in which a rotor core comprises rotor core lobes and magnets.

Referring now to the illustrative variation depicted in FIG. 1, a rotor 101 may rotate around an axial axis and may comprise a rotor core 102 that may comprise at least one rotor core lobe 103. The rotor 101 may further comprise at least one magnet 104 attached to the at least one rotor core lobe 103. The rotor core 102 may comprise at least one hollow portion 112. The at least one hollow portion may run through only part of the rotor core 102, or it may run through the entire rotor core 102 and it may vary in size. Alternatively, the rotor core 102 may be entirely solid. The entire rotor 101 may fall within the circumference of a first imaginary cylinder 110 having a radius which will be referred to with regard to this illustrative variation as the primary radius 105. A second imaginary cylinder 111 may describe the largest cylindrical portion of the rotor core 102 that excludes the at least one rotor core lobe 103. The second imaginary cylinder 111 may have a circumference having a radius which will be referred to with regard to this illustrative variation as the secondary radius 106. The at least one rotor core lobe 103 may have a lobe curvature radius 109. The at least one magnet 104 may have an outer magnet curvature radius 107 and an inner magnet curvature radius 108. In the illustrative variation depicted in FIG. 1, the outer magnet curvature radius 107 is of equal length to the inner magnet curvature radius 108. Although these radii being of equal lengths improves the efficiency of magnet manufacture both economically and mechanically, the radii do not need to be of equal lengths.

Figure 2:
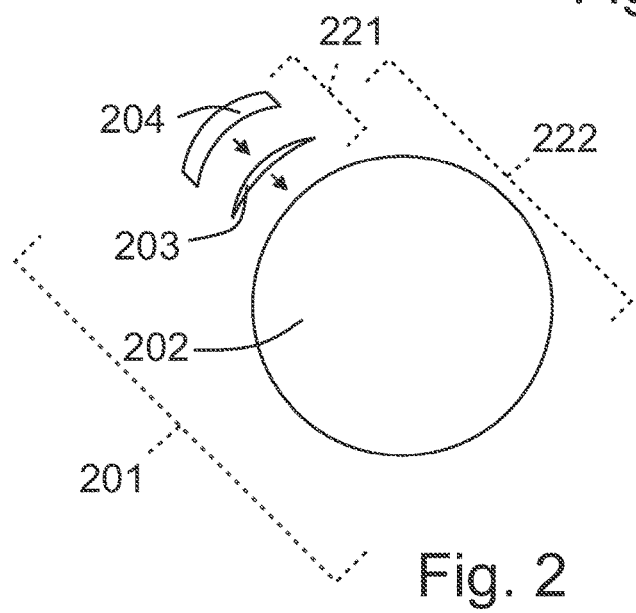
FIG. 2 depicts an illustrative variation in which a rotor is constructed from joining separate pieces including a rotor core, a rotor core lobe, and a magnet.

Referring now to the illustrative variation depicted in FIG. 2, a rotor 201 may be constructed by attaching a magnet 204 to a rotor core lobe 203, to create a magnet and lobe 221, and then attaching the magnet and lobe 221 to a rotor core 202. Alternatively, a rotor core lobe 203 may be attached to a rotor core 202, to create a rotor core and lobe 222, and a magnet 204 may then be attached to the rotor core and lobe 222. Lastly, the magnet 204, rotor core lobe 203, and rotor core 202 may be attached to each other simultaneously. Attachment may be accomplished by adhesion, fastening, welding, dovetailing or any other known method.

Figure 3:
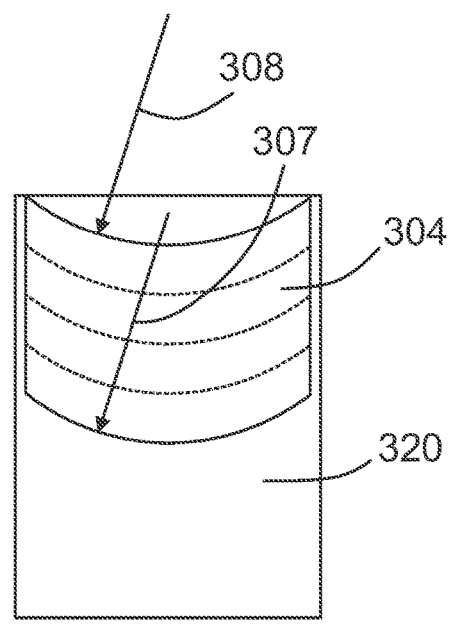
FIG. 3 depicts an illustrative variation in which uniform magnets of a specialized shape are taken from the same piece of magnetic material with increased efficiency.

Referring now to the illustrative variations depicted in FIGS. 1 and 3, during manufacturing, a magnet 304 may be cut, stamped out, or taken in any other known method from a larger piece of magnet material 320. The addition of at least one core lobe 103 to a rotor core 102 may improve the efficiency of rotor 101 manufacturing by allowing specially shaped magnets 304 that reduce cogging torque to be attached to the rotor core 102 via the rotor core lobes 103. Such specially shaped magnets 304 can be cut from magnetic material 320 in a pattern that reduces the amount of wasted magnet material 320 thus increasing rotor magnet 304 manufacturing efficiency and therefore also increasing rotor 101 manufacturing efficiency. As a non-limiting example, when the inner magnet curvature radius 308 and the outer magnet curvature radius 307 of a magnet 304 are of equal lengths, the magnet 304 may be cut from a sheet of magnet material 320 without creating any wasted material between cuts.

Figure 4:
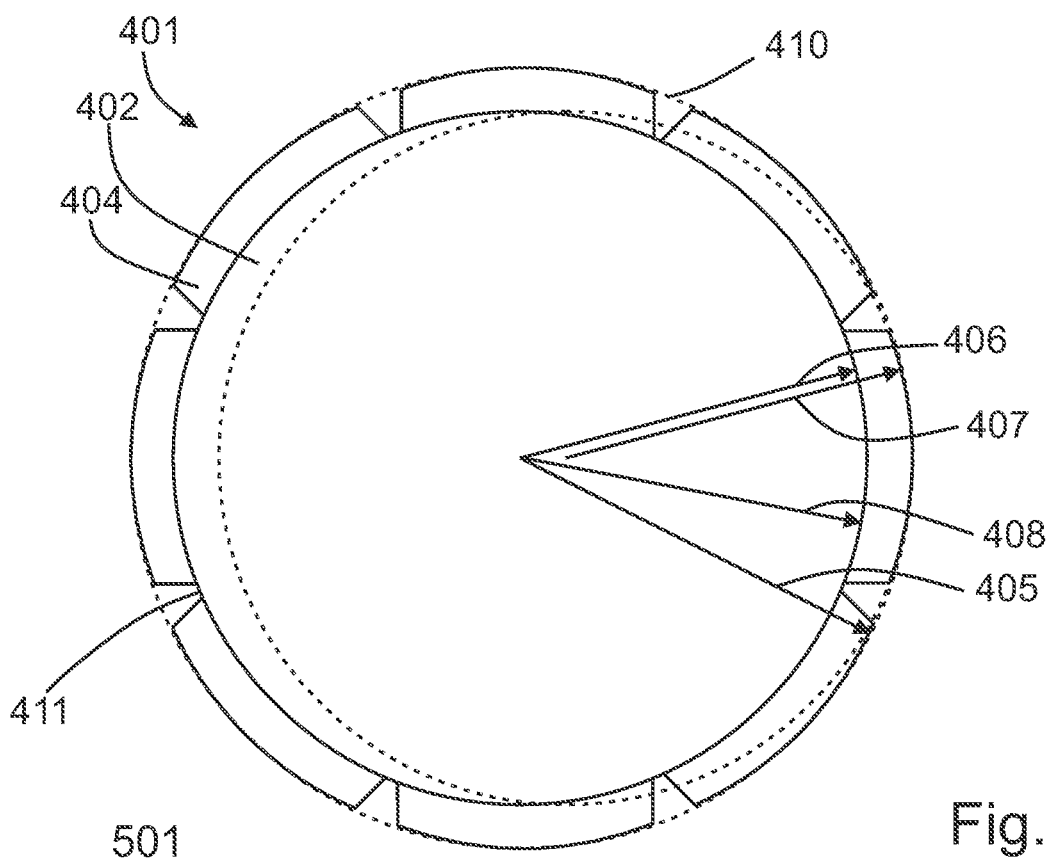
FIG. 4 depicts a radial view of an illustrative variation in which a rotor core comprises magnets, and wherein the curvatures of both the inner faces and outer faces of the rotor magnets are described by a radius having the same length as the secondary radius of the rotor.
Figure 5:
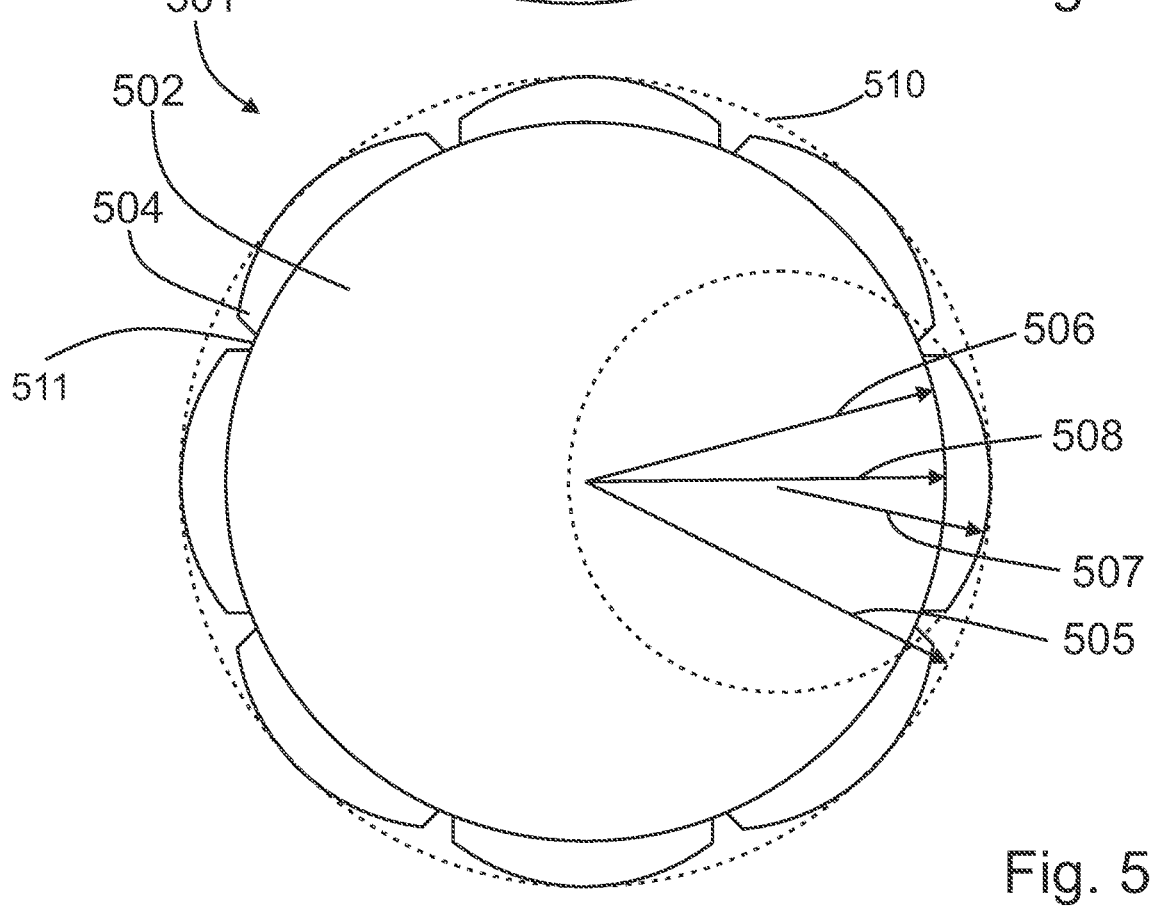
FIG. 5 depicts a radial view of an illustrative variation in which a rotor does not comprise rotor core lobes and wherein the inner and outer faces of the rotor magnets have different curvature radii lengths.
Figure 6:
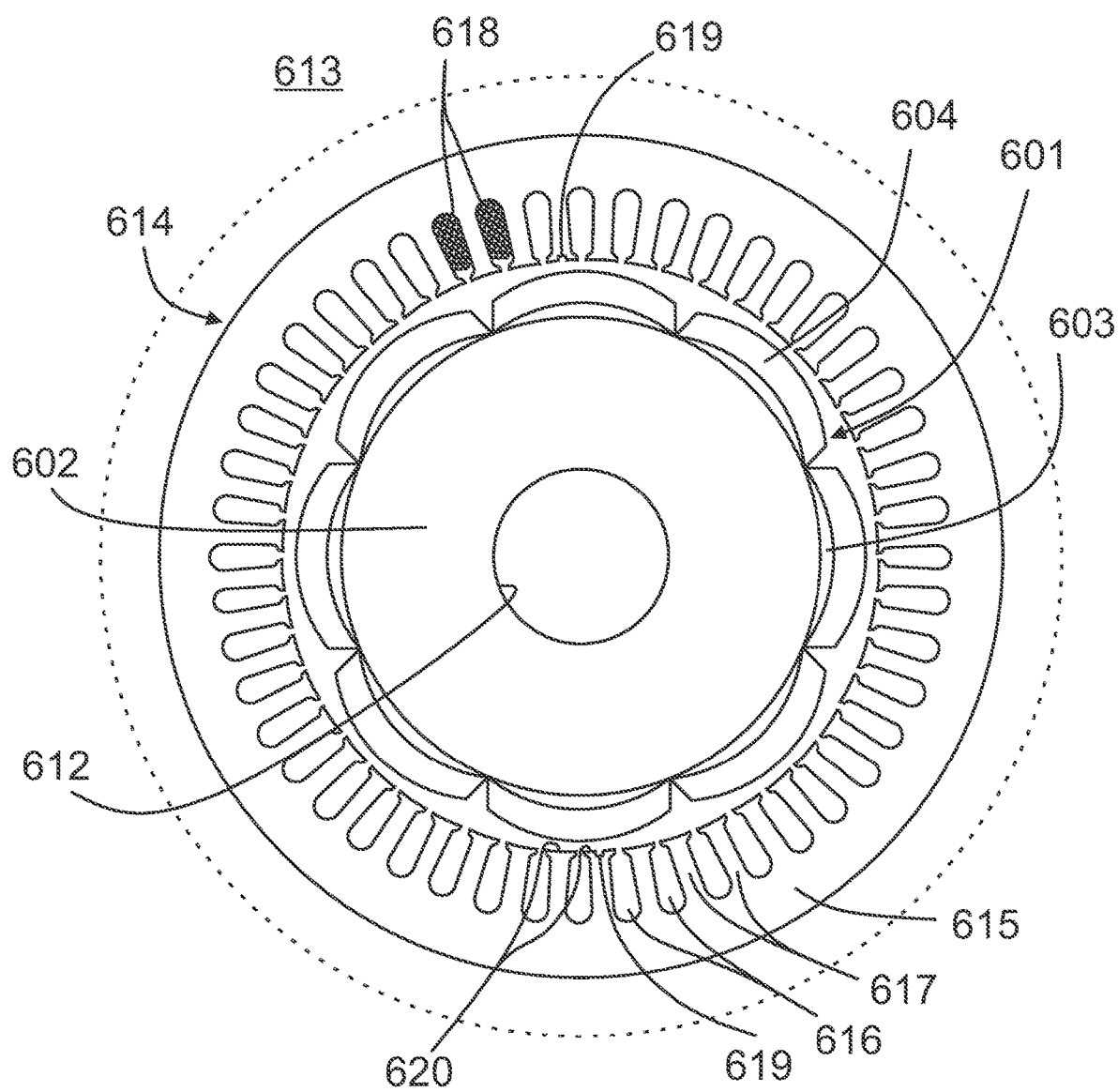
FIG. 6 depicts a radial view of an illustrative variation in which an electric motor comprises a stator and a rotor. In this illustrative variation the stator comprises a core, slots and teeth, some of which have notches. This illustrative variation also shows a rotor that comprises pole lobes and wherein the inner and outer faces of the rotor magnets have equal curvature radii lengths.

Referring now to the illustrative variation depicted in FIGS. 4 and 5, a rotor 401, 501 may be comprised of a rotor core 402, 502, and magnets 404 or magnets having non-uniform thickness 504. A portion of the rotor core 402, 502 may be hollow (as shown in FIG. 6). The entire rotor 401, 501 may fall within the circumference of a first imaginary cylinder 410, 510 having a radius which will be referred to with regard to this illustrative variation as the primary radius 405, 505. A second imaginary cylinder 411, 511 may comprise the largest portion of the rotor core that excludes the magnets 404 or magnets having non-uniform thickness 504 and may have a radius which will be referred to with regard to this illustrative variation as the secondary radius 406, 506. To improve cogging torque, the magnets 404 may be shaved, ground, cut or reduced in any manner known in the art to produce magnets having non-uniform thickness 504.

Referring to the illustrative variation depicted in FIG. 6, an electric motor 613 may comprise a stator 614, and the stator 614 may be comprised of stacks of laminated conductive material. The stator 614 may also comprise a stator core 615, stator slots 616, stator teeth 617—each having a stator tooth face 620—, and windings 618 that may be energized such that an electromagnetic field is generated by the stator 614. The electric motor 613 may generate the electromagnetic field by energizing the windings 618 of the stator 614 to exert force upon a magnet 604 of a rotor 601. As depicted in FIG. 6, the windings 618 may be located between the stator teeth 617 in some or all of the stator slots 616. Cogging torque may be reduced by placing notches 619 in the stator teeth 617, thereby reducing straying or fringing magnetic flux by drawing any straying or fringing magnetic flux closer to the surface of the teeth 617. When included, the notches 619 may be of any shape conducive to reducing cogging torque and at any location on the stator teeth 617 that is conducive to reducing cogging torque. Notches 619, as depicted in FIG. 6, are located at the stator tooth face 620 and are of a quadrilateral shape, but may be triangular, round, or any other shape that is known to reduce cogging torque and may be located on the any other edge of any stator tooth. When included, notches 619 need not be placed in each of the stator teeth 617. Cogging torque may be additionally reduced by using a rotor core 602 comprising rotor core lobes 603 that allow at least one magnet 604, having a cog-torque-reducing shape, to be attached thereto. In such illustrative variations, the rotor core 602 may also comprise a hollow portion 612.

Referring now to the illustrative variation depicted in FIG. 7. A rotor core 702 may comprise skewed rotor core lobes 703. The skewed rotor core lobes 703 may be comprised a single continuous piece indistinct from the rotor core 702. The skewed rotor core lobes may also be separate pieces from the rotor core 702 that are appended to the rotor core 702.

Referring now to the illustrative variation depicted in FIG. 8. A rotor core 802 may comprise skewed rotor core lobes 803. The skewed rotor core lobes 803 may be formed from a number of stacked and bonded rotor core disks 821 having lobe-forming anomalies 822 at their circumference. The rotor core disks 821 may be stacked and bonded in a skewed fashion such that the stacked and bonded rotor core disks 821 form a rotor core 802 wherein the lobe-forming anomalies 822 of the disks 821 form skewed rotor core lobes 803. As can be appreciated from FIG. 8, any time that the rotor core and rotor core lobes are formed of segments, the segments may be out of alignment with each other in a manner that affects the shape or skew of the lobes. As a non-limiting example, if a rotor core is comprised of stacked and bonded disks having lobe-forming anomalies, the disks may be out of alignment with each other such that the rotor core lobes formed by the stacking and bonding of the disks are skewed in a stepped fashion wherein a circumferential edge of a lobe-forming anomaly of a first disk may not seamlessly meet the circumferential edge of the lobe-forming anomaly of a second disk when the first and second disk are stacked and bonded—thus forming a step in the lobe that is formed by the stacking and bonding of the disks. The formed lobes may also be skewed in a continuous fashion wherein a circumferential edge of a lobe-forming anomaly of a first disk may seamlessly meet the circumferential edge of a lobe-forming anomaly of a second disk when the first and second disk are bonded. As a non-limiting example, continuous lobe skew in a such a variation may be achieved by manufacturing the disks such that the lobe-forming anomalies may be misaligned and yet form a seamless edge when stacked and bonded as shown in FIG. 8. It may also be appreciated from FIG. 8 that the rotor core may be formed of disks of any thickness, or segments of any shape and assembled in any fashion that yields a rotor core having at least one rotor core lobe or reduces cogging torque during operation of the rotor, as described herein.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising:
a rotor comprising:
a rotor core comprising at least one rotor core lobe having a lobe curvature radius; and,
at least one magnet having an inner magnet curvature radius and an outer magnet curvature radius, wherein the at least one magnet is attached to the at least one lobe at the lobe curvature radius, wherein the rotor is described by a primary radius that describes an imaginary cylinder encompassing the rotor and by a secondary radius that describes an imaginary cylinder encompassing the largest unbroken cylinder of rotor core material that does not include the at least one rotor core lobe.

Variation 2 may include the product of variation 1, wherein the lobe curvature radius is shorter than the primary radius.

Variation 3 may include the product of variations 1 or 2, wherein the lobe curvature radius is shorter than the secondary radius.

Variation 4 may include the product of variations 1 through 3, wherein the rotor core is comprised of more than one piece.

Variation 5 may include the product of variations 1 through 4, wherein the at least one rotor core lobe is a separate piece from the rotor core.

Variation 6 may include the product of variations 1 through 5 wherein the inner magnet curvature radius and the outer magnet curvature radius are of the same length.

Variation 7 may include the product of variations 1 through 6 wherein the lobe curvature radius is of the same length as the inner magnet curvature radius as well as the outer magnet curvature radius.

Variation 8 may include the product of variations 1 through 7 wherein the rotor further comprises at least one non-lobe magnet that is not attached to the at least one rotor core lobe and is instead attached to the rotor core surface at the secondary radius.

Variation 9 may include the product of variations 1 through 8 wherein the at least one rotor core lobe and the rotor core are a single continuous piece.

Variation 10 may include the product of variations 1 through 8 wherein the rotor core comprising at least one rotor core lobe is comprised of at least one segment.

Variation 11 may include the product of variation 10 wherein the at least one segment are disks having lobe-forming anomalies in a radial direction at their circumferences.

Variation 12 may include the product of variations 1 through 11 wherein the at least one lobe is a skewed lobe.

Variation 13 may include the product of variations 1 through 12 wherein the skewed lobe is skewed in a stepped fashion.

Variation 14 may include the product of variations 1 through 12 wherein the skewed lobe is skewed in a continuous fashion.

Variation 15 may include a product comprising:
An electric motor comprising:
a rotor comprising:
a rotor core comprising at least one rotor core lobe having a lobe curvature radius;
at least one magnet having an inner magnet curvature radius and an outer magnet curvature radius, wherein the at least one magnet is attached to the at least one lobe at the lobe curvature radius, wherein the rotor is described by a primary radius that describes an imaginary cylinder encompassing the rotor and by a secondary radius that describes an imaginary cylinder encompassing the largest unbroken cylinder of rotor core material that does not include the at least one rotor core lobe;

a stator comprising at least one slot, at least one tooth, and one or more electrically conductive wire windings, wherein the stator surrounds the rotor and is constructed and arranged to generate an electromagnetic field when the one or more windings are energized.

Variation 16 may include the product of variation 15 wherein the at least one stator tooth includes at least one notch.

Variation 17 may include the product of variation 1 through 16 wherein the lobe curvature radius is of the same length as the inner magnet curvature radius as well as the outer magnet curvature radius.

Variation 18 may include the product of variations 1 through 17 wherein the rotor core comprising at least one rotor core lobe is comprised of at least two segments.

Variation 19 may include the product of variation 18 wherein the at least two segments are disks having lobe-forming anomalies in a radial direction at their circumferences.

The above description of select variations within the scope of the invention is merely illustrative in nature and, thus, variations or variants thereof are not to be regarded as a departure from the spirit and scope of the invention.

What is claimed is:

1. A product comprising:
a rotor comprising:
a rotor core comprising a plurality of rotor core lobes, wherein each lobe of the plurality of rotor core lobes has a lobe curvature radius, wherein each rotor core lobe is a single piece; and,
a plurality of magnets, wherein each magnet of the plurality of magnets has an inner magnet curvature radius and an outer magnet curvature radius, wherein each lobe has only one magnet of the plurality of magnets attached at the lobe curvature radius, wherein each magnet is attached to only one lobe, wherein the rotor is described by a primary radius that describes an imaginary cylinder encompassing the rotor and by a secondary radius that describes an imaginary cylinder encompassing the largest unbroken cylinder of rotor core material that does not include the at least one rotor core lobe; wherein each rotor core lobe is skewed along the circumference of the rotor as the at least one rotor core lobe runs the length of the rotor.

2. The product of claim 1, wherein the lobe curvature radius is shorter than the primary radius.

3. The product of claim 1, wherein the lobe curvature radius is shorter than the secondary radius.

4. The product of claim 1, wherein the rotor core is comprised of more than one piece.

5. The product of claim 1, wherein the at least one rotor core lobe is a separate piece from the rotor core.

6. The product of claim 1, wherein the inner magnet curvature radius and the outer magnet curvature radius are of the same length.

7. The product of claim 6, wherein the lobe curvature radius is of the same length as the inner magnet curvature radius as well as the outer magnet curvature radius.

8. The product of claim 1 wherein the at least one rotor core lobe and the rotor core are a single continuous piece.

9. The product of claim 1 wherein the rotor core comprising at least one rotor core lobe is comprised of at least one segment.

10. The product of claim 9 wherein the at least one segment is a disk having lobe-forming anomalies in a radial direction at its circumference.

11. A product comprising:
an electric motor comprising:
a rotor comprising:
a rotor core comprising a plurality of rotor core lobes, wherein each lobe of the plurality of rotor core lobes has a lobe curvature radius, wherein each rotor core lobe is a single piece;
a plurality of magnets, wherein each magnet of the plurality of magnets has an inner magnet curvature radius and an outer magnet curvature radius, wherein each lobe has only one magnet of the plurality of magnets attached at the lobe curvature radius, wherein each magnet is attached to only one lobe, wherein the rotor is described by a primary radius that describes an imaginary cylinder encompassing the rotor and by a secondary radius that describes an imaginary cylinder encompassing the largest unbroken cylinder of rotor core material that does not include the at least one rotor core lobe; wherein each rotor core lobe is skewed along the circumference of the rotor as the at least one rotor core lobe runs the length of the rotor;
a stator comprising at least one slot, at least one tooth, and one or more electrically conductive wire windings, wherein the stator surrounds the rotor and is constructed and arranged to generate an electromagnetic field when the one or more windings are energized.

12. The product of claim 11, wherein the at least one stator tooth includes at least one notch.

13. The product of claim 11 wherein the lobe curvature radius is of the same length as the inner magnet curvature radius as well as the outer magnet curvature radius.

14. The product of claim 1 wherein the rotor core comprising at least one rotor core lobe is comprised of at least two segments.

15. The product of claim 14 wherein the at least two segments are disks having lobe-forming anomalies in a radial direction at their circumferences.

16. The product as set forth in claim 1 wherein the at least one rotor core lobe runs the entire length of the rotor.

17. The product as set forth in claim 1 further comprising a plurality of rotor core lobes, and wherein each rotor core lobe of the plurality of rotor core lobes is skewed along the circumference of the rotor as the at least one rotor core lobe runs the length of the rotor so that the plurality of rotor core lobes appear to be twisting around an axial axis of the rotor.

18. A product comprising:
a rotor comprising:
a rotor core comprising a plurality of disks, each disk having a plurality of lobes formed along the circumference of the disk, the plurality of disk comprising repeating sets of a first disk and a second disk being stacked and bonded wherein the second disk is rotated with respect to the first disk and wherein adjacent sets are rotated with respect to each other so that the plurality of disks are misaligned with each other so that a plurality of lobes along the axial direction of the rotor are skewed along the circumference of the rotor, each lobe having a magnet attached onto the lobe at a lobe curvature radius and wherein each magnet is attached to only one lobe, wherein each magnet has an inner magnet curvature radius and an outer magnet curvature radius, wherein the rotor is described by a primary radius that describes an imaginary cylinder encompassing the rotor and by a secondary radius that describes an imaginary cylinder encompassing the largest unbroken cylinder of rotor core material that does not include the plurality of lobes.

19. A product as set forth in claim 17 wherein the plurality of lobes along the axial direction are skewed in a continuous fashion wherein the a circumferential edge of one lobe of the first disk seamlessly meets a circumferential edge of one lobe of the second disk.

20. A product comprising:
a rotor comprising:
a rotor core comprising a plurality of disks that are identical, each disk having a cylindrical outer surface without lobes and a plurality of magnets attached along the cylindrical outer surface of the disk, wherein each magnet of the plurality of magnets has an inner magnet curvature radius and an outer magnet curvature radius, wherein each magnet has the outer magnet curvature radius is not equal length to an inner magnet curvature radius so that each magnet has an outer curvature that converges on and inner curvature so that each magnet has a non-uniform thickness, wherein the plurality of disk comprising a repeating set of a first disk and a second disk being stack and bonded, wherein each second disk is rotated with respect to a first disk so that the plurality of disks are misaligned with each other so that a plurality of magnets along the axial direction of the rotor are skewed along the circumference of the rotor.

21. A product comprising:
a rotor comprising:
a rotor core comprising a plurality of disks that are identical, each disk having a plurality of lobes attached along the circumference of the disk and a plurality f magnets, wherein each one of the plurality of lobes has an associate magnet of the plurality of magnets so that each lobe of the plurality of lobe has only one magnet attached thereto, wherein each magnet of the plurality of magnets has an inner magnet curvature radius equal to an outer magnet curvature radius so that each magnet has a uniform thickness, wherein the plurality of disk comprising a repeating set of a first disk and a second disk being stack and bonded, wherein each second disk is rotated with respect to a first disk so that the plurality of disks are misaligned with each other so that a plurality of magnets along the axial direction of the rotor are skewed along the circumference of the rotor.

* * * * *